United States Patent
Li et al.

(10) Patent No.: US 10,591,665 B2
(45) Date of Patent: Mar. 17, 2020

(54) BACKLIGHT MODULE AND LIQUID CRYSTAL DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventors: Jinze Li, Beijing (CN); Zhendong Zhou, Beijing (CN); Tianlong Li, Beijing (CN); Hongqiang Chen, Beijing (CN); Shijia Jin, Beijing (CN); Yingli Meng, Beijing (CN); Dongsheng Yang, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 134 days.

(21) Appl. No.: 15/508,018

(22) PCT Filed: Feb. 18, 2016

(86) PCT No.: PCT/CN2016/074047
§ 371 (c)(1),
(2) Date: Mar. 1, 2017

(87) PCT Pub. No.: WO2017/036100
PCT Pub. Date: Mar. 9, 2017

(65) Prior Publication Data
US 2017/0293063 A1 Oct. 12, 2017

(30) Foreign Application Priority Data
Sep. 1, 2015 (CN) .......................... 2015 1 0555700

(51) Int. Cl.
*F21V 8/00* (2006.01)

(52) U.S. Cl.
CPC ........... *G02B 6/009* (2013.01); *G02B 6/0038* (2013.01); *G02B 6/0068* (2013.01); *G02B 6/0083* (2013.01)

(58) Field of Classification Search
CPC .... G02B 6/009; G02B 6/0038; G02B 6/0068; G02B 6/0083
See application file for complete search history.

(56) References Cited

U.S. PATENT DOCUMENTS 5,803,573 A * 9/1998 Osawa .................... G01D 11/28
362/23.15
7,671,936 B2 * 3/2010 Chang ................... G02B 6/0068
349/58
(Continued)

FOREIGN PATENT DOCUMENTS

CN 101097340 A 1/2008
CN 101304059 A 11/2008
(Continued)

OTHER PUBLICATIONS

International Search Report dated May 31, 2016; PCT/CN2016/074047.
(Continued)

*Primary Examiner* — Arman B Fallahkhair
(74) *Attorney, Agent, or Firm* — Ladas & Parry LLP

(57) ABSTRACT

A backlight module, including a light guide plate and a flexible circuit board, wherein an edge of the light guide plate is provided with plural light source mounting holes disposed along a thickness direction of the light guide plate; a light source is mounted in every light source mounting hole in such a manner that a light emitting surface of the light source is attached onto a hole wall of the light source mounting hole; plural groups of anode-cathode conductive parts are disposed on the flexible circuit board in one-to-one correspondence with the plural light source mounting holes,
(Continued)

each being connected to an anode and a cathode of the light source in a corresponding light source mounting hole. The backlight module improves the brightness and uniformity of the light entering the light guide plate. A liquid display device including the above-mentioned backlight module is further provided.

10 Claims, 2 Drawing Sheets

(56) References Cited

U.S. PATENT DOCUMENTS

| | | | | |
|---|---|---|---|---|
| 7,940,353 B2* | 5/2011 | Tanaka | ............... | G02B 6/0021 349/150 |
| 7,997,784 B2* | 8/2011 | Tsai | ............... | G02B 6/0021 362/621 |
| 8,480,286 B2* | 7/2013 | Tsai | ............... | G02B 6/0021 349/58 |
| 9,201,189 B2* | 12/2015 | Lee | ............... | G02B 6/0021 |
| 2008/0002099 A1 | 1/2008 | Oh | | |
| 2010/0155751 A1 | 6/2010 | Kuo et al. | | |
| 2011/0305003 A1 | 12/2011 | Lee et al. | | |
| 2013/0100668 A1 | 4/2013 | Hsu | | |
| 2017/0003441 A1* | 1/2017 | Choi | ............... | H05K 1/189 |

FOREIGN PATENT DOCUMENTS

| | | |
|---|---|---|
| CN | 101685222 A | 3/2010 |
| CN | 201967250 U | 9/2011 |
| CN | 102937262 A | 2/2013 |
| CN | 103062666 A | 4/2013 |
| CN | 103076649 A | 5/2013 |
| CN | 203615255 U | 5/2014 |
| CN | 105093681 A | 11/2015 |
| KR | 20070101517 A | 10/2007 |
| KR | 20080056365 A | 6/2008 |

OTHER PUBLICATIONS

Written Opinion of the International Searching Authority dated Jun. 2, 2016; PCT/CN2016/074047.
The First Chinese Office Action dated Jul. 17, 2017; Appln. No. 201510555700.1.

* cited by examiner

BACKLIGHT MODULE AND LIQUID CRYSTAL DISPLAY DEVICE

TECHNICAL FIELD

Embodiments of the present disclosure relate to a backlight module and a liquid crystal display device.

BACKGROUND

A backlight module, as a key component of a liquid crystal display, can provide a surface light source for the liquid crystal display such that the liquid crystal display can display an image normally. At current, the light source used in the backlight module mainly includes a Light Emitting Diode (LED) and a Cold Cathode Fluorescent Lamp (CCFL), wherein the light emitted by the LED backlight source using the LED as the light source has a wider color gamut and a better color expression capacity. Therefore, manufacturing methods of the LED backlight module have drawn extensive attentions from users.

Referring to FIG. 1, for the production of the LED backlight module using the LED as the light source, an assembling process of an LED lamp strip with a light guide plate 1 includes: coating a flexible circuit board 2 with solder paste, attaching an LED to the solder paste on the flexible circuit board, then fixing the LED attached to the solder paste on the flexible circuit board 2 by adopting a reflow soldering process so as to form the LED lamp strip, then connecting the flexible circuit board 2 on which the LED lamp strip is formed with the light guide plate 1 such that a light emitting surface of the LED is attached to a light incident surface of the light guide plate 1, thus finishing assembling of the LED lamp strip and the light guide plate 1.

However, during forming the LED lamp strip, as the reflow soldering process is performed under a high temperature at which the solder paste is melt and flows, the LED may be shifted and hence deviated from a position preset for the LED on the flexible circuit board 2 when fixing the LED attached to the solder paste on the flexible circuit board 2 by adopting the reflow soldering process; as a result, a gap would be generated between the light emitting surface of the LED and the light incident surface of the light guide plate 1 on the same lamp strip, which may result in that the light entering the light guide plate 1 involves problems of poor backlight brightness and poor uniformity.

SUMMARY

At least one embodiment of the present disclosure provides a backlight module, including a light guide plate and a flexible circuit board, wherein an edge of the light guide plate is provided with plural light source mounting holes disposed along a thickness direction of the light guide plate; a light source is mounted in every light source mounting hole, and a light emitting surface of the light source is attached onto a hole wall of the light source mounting hole; plural groups of anode-cathode conductive parts are disposed on the flexible circuit board in one-to-one correspondence with the plural light source mounting holes, and every group of anode-cathode conductive part is connected to an anode and a cathode of the light source in a corresponding light source mounting hole.

At least one embodiment of the present disclosure further provides a liquid display device including the above-mentioned backlight module.

In the backlight module according to the embodiment of the present disclosure, an edge of the light guide plate is provided with plural light source mounting holes, a light source is disposed in the light source mounting hole through a connector in such a manner that a light emitting surface of the light source is attached onto a light incident surface of the light guide plate, and a flexible circuit board is connected to the anode and the cathode on the light source through a anode-cathode conductive part disposed on the flexible circuit board; in this way, a power supply from the flexible circuit board to the light source is realized. The flexible circuit board supplies power to the light source to enable the light source to emit light, and since the light emitting surface of the light source and the light incident surface of the light guide plate are attached onto each other, the light emitted by the light source will directly enter the light guide plate, which prevents the light emitted by the light source from being consumed before entering the light guide plate; moreover, the light sources are uniformly distributed on the light incident surface of the light guide plate according to the positions of the light source mounting holes, thus it is ensured that the light emitted by the light source uniformly enters the light guide plate through the light incident surface of the light guide plate, thereby solving the problems of poor backlight brightness and poor uniformity of the light entering the light guide plate. Besides, in the backlight module according to the embodiment of the present disclosure, the process of assembling the light source and the light guide plate only requires to mount the light source in the light source mounting hole, so there is no significant deviation of the light source from the light guide plate due to insufficient proficiency of an operator.

The backlight module and the liquid display device according to the embodiments of the present disclosure solve the problem that the light entering the light guide plate is poor in both brightness and uniformity due to a gap generated between the light emitting surface of the LED and the light incident surface of the light guide plate on the same lamp strip.

Additionally, in the prior art, the light source and the flexible circuit board are connected by utilizing a reflow soldering process to realize power supply from the flexible circuit board to the light source. As a comparison, in the embodiments of the present disclosure, the light source is fixed in the light source mounting hole, and then the anode and the cathode on the light source is connected to the anode-cathode conductive part on the flexible circuit board so as to achieve the power supply to the light source from the flexible circuit board, which avoids the problem in the reflow soldering process that the light source is deviated from a position preset for the light source on the flexible circuit board caused by hot melting of solder paste, and which also simplifies the assembling process of the backlight module.

BRIEF DESCRIPTION OF THE DRAWINGS

Hereafter, the embodiments of the present invention will be described in a more detailed way with reference to the accompanying drawings, so as make one person skilled in the art be able to understand the present invention more clearly, wherein.

DETAILED DESCRIPTION

Hereafter, the technical solutions in the embodiments of the present disclosure will be described in a clearly and fully understandable way in connection with the drawings in the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the disclosure.

Unless otherwise defined, the technical terminology or scientific terminology used herein should have the same meaning as commonly understood by one of ordinary skill in the art to which this invention belongs. Likewise, terms like "first," "second," etc., which are used in the description and the claims of the present application for invention, are not intended to indicate any sequence, amount or importance, but distinguish various components. The phrases "connect", "connected", etc., are not intended to define a physical connection or mechanical connection, but may include an electrical connection, directly or indirectly. "On," "under," "left," "right" or the like is only used to describe a relative positional relationship, and when the absolute position of a described object is changed, the relative positional relationship might also be changed accordingly.

Figure 1:
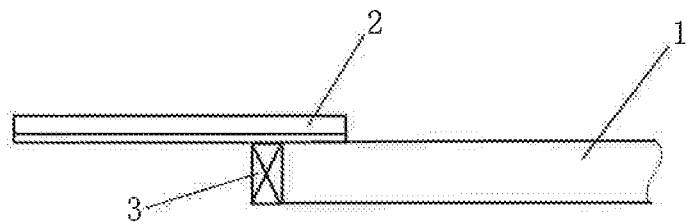
FIG. 1 is an assembling structural diagram of a light source, a flexible circuit board and a light guide plate in the prior art.
Figure 2A:
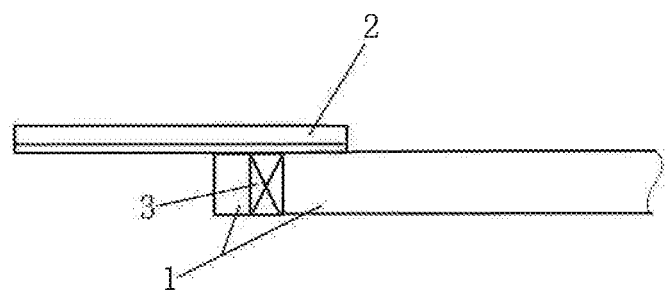
FIG. 2A and FIG. 2B are assembling structural diagrams of a light source, a flexible circuit board and a light guide plate according to an embodiment of the present disclosure.
Figure 2B:
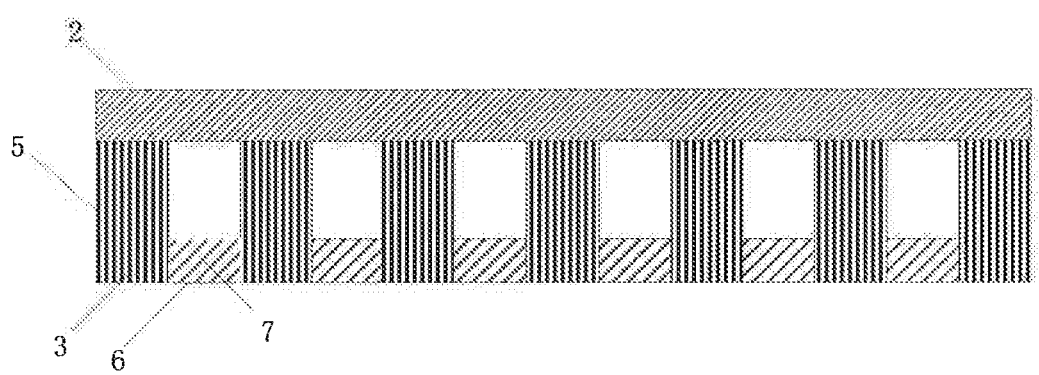
Figure 3:
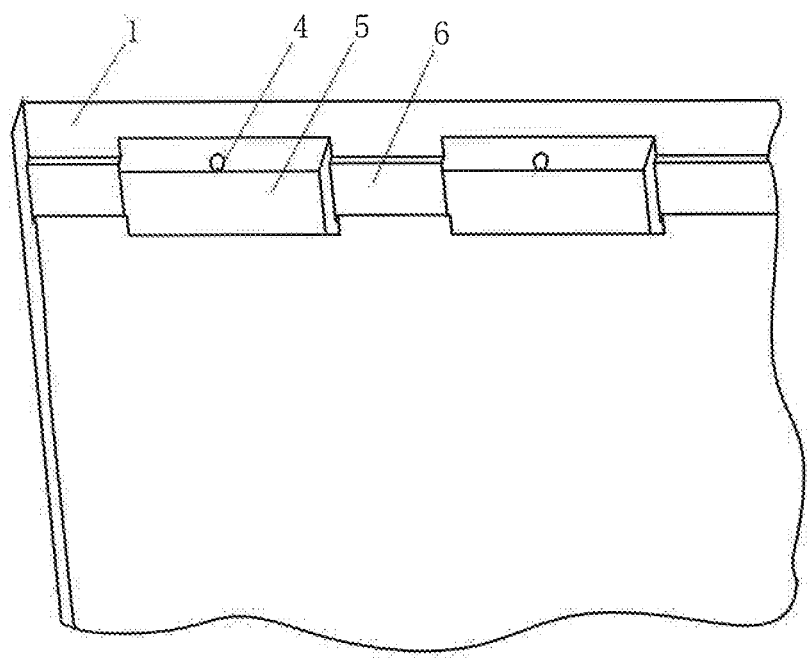
FIG. 3 is a structural diagram of a light guide plate in a backlight module according to an embodiment of the present disclosure.
Figure 4:
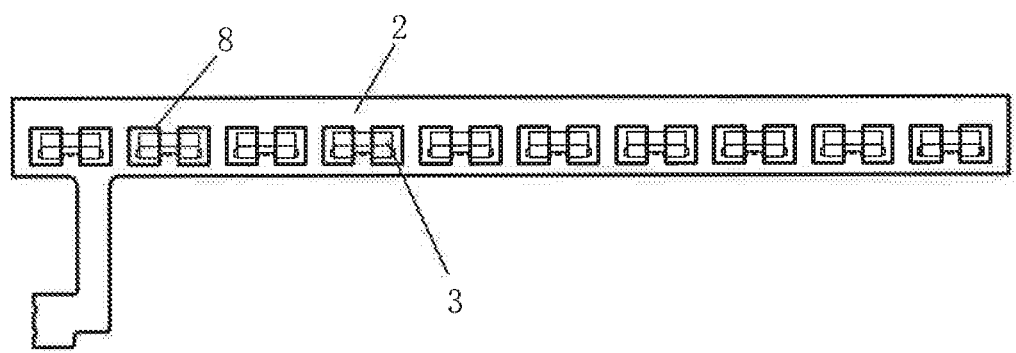
FIG. 4 is a schematic diagram illustrating a connection between a flexible circuit board and a light source in a backlight module according to an embodiment of the present disclosure.

Referring to FIGS. 2-4, a backlight module according to an embodiment of the present disclosure includes a light guide plate 1 and a flexible circuit board 2; an edge of the light guide plate 1 is provided with a plurality of light source mounting holes 5 disposed along a thickness direction of the light guide plate; a light source 3 is mounted in every light source mounting hole 5 through a connector 4, and a light emitting surface of the light source 3 is attached to a hole wall of the light source mounting hole 5; plural groups of anode-cathode conductive parts 8 are disposed on the flexible circuit board 2 in one-to-one correspondence with the light source mounting holes 5, and every group of anode-cathode conductive parts 8 is connected to an anode and a cathode of the light source 3 in the light source mounting hole 5.

In an embodiment of the present disclosure, on the edge of the light emitting surface of the light guide plate 1 or the edge of a bottom surface opposite to the light emitting surface, the light source mounting hole 5 is formed, and the connector 4 is disposed on the hole wall of the light source mounting hole 5. It should be noted that there are many methods of forming the light source mounting holes 5 in the light guide plate 1, for example, the light source mounting hole 5 can be formed in the light guide plate 1 by using an injection molding method, the light source mounting hole 5 can be a blind hole or a through hole, and a volume of the light source mounting hole 5 is matched with the light source 3 such that the light source 3 can be just placed in the light source mounting hole 5; in this way, the light emitting surface of the light source 3 can be contacted with the hole wall of the corresponding light source mounting hole 5, which prevents the light source 3 from shaking.

In a process of assembling the backlight module, the light source 3 is mounted in the light source mounting hole 5 by the connector 4 in such a manner that: the light emitting surface of the light source 3 is attached to the hole wall of the light source mounting hole 5 (i.e., the light emitting surface of the light source 3 and the light incident surface of the light guide plate 1 are attached onto each other), the anode and the cathode of the light source 3 face towards an opening of the light source mounting hole 5, and the anode-cathode conductive part 8 disposed on the flexible circuit board 2 is connected to the anode and the cathode of the light source 3 respectively; in this way, the flexible circuit board 2 supplies power to the light source 3. When the flexible circuit board 2 supplies power to the light source 3, the light source 3 is enabled to emit light, the light emitted by the light source 3 enters the light guide plate 1 through the light incident surface of the light guide plate 1 and then emerges from the light emitting surface of the light guide plate 1, thereby realizing a light emitting process of the backlight module.

According to the assembling and working process of the backlight module provided by the embodiment of the present disclosure, plural light source mounting holes 5 are disposed on the edge of the light guide plate 1, the light source 3 is mounted in the light source mounting hole 5 through the connector 4 in such a manner that the light emitting surface of the light source 3 and the light incident surface of the light guide plate 1 are attached onto each other, and the flexible circuit board 2 is connected to the anode and the cathode on the light source 3 through the anode-cathode conductive part 8; in this way, a power supply to the light source 3 from the flexible circuit board 2 is realized. The flexible circuit board 2 supplies power to the light source 3 to enable the light source 3 to emit light, and since the light emitting surface of the light source 3 and the light incident surface of the light guide plate 1 are attached onto each other, the light emitted by the light source 3 will directly enter the light guide plate 1, which prevents the light emitted by the light source 3 from being consumed before entering the light guide plate 1; moreover, the light sources 3 are uniformly distributed on the light incident surface of the light guide plate 1 according to the positions of the light source mounting holes 5, thus it is ensured that the light emitted by the light source 3 uniformly enters the light guide plate 1 through the light incident surface of the light guide plate 1, thereby solving the problems of poor backlight brightness and poor consistency of the light entering the light guide plate 1. Besides, in the backlight module according to the embodiment of the present disclosure, the process of assembling the light source 3 and the light guide plate 1 only requires to mount the light source 3 in the light source mounting hole 5, so there is no significant deviation of the light source 3 from the light guide plate 1 due to insufficient proficiency of an operator.

Additionally, in the prior art, the light source 3 and the flexible circuit board 2 are connected by utilizing a reflow soldering process to realize power supply from the flexible circuit board 2 to the light source 3. As a comparison, in the embodiment of the present disclosure, the light source 3 is fixed in the light source mounting hole 5, and then the anode and the cathode on the light source 3 are connected to the anode-cathode conductive part 8 on the flexible circuit board 2 so as to achieve the power supply from the flexible circuit board 2 to the light source 3, which avoids the problem in the reflow soldering process that the light source 3 is deviated from a position preset for the light source 3 on the flexible circuit board 2 caused by hot melting of the solder paste, and which also simplifies the assembling process of the backlight module.

It needs to be explained that there are plenty of methods for achieving the connection between the anode-cathode conductive part 8 and the anode and the cathode on the light source 3, for example, it's possible to connect the flexible circuit board 2 with the light guide plate 1 and also ensure the anode-cathode conductive part 8 being contact with the anode and the cathode on the light source 3, which however is not intended to limit the embodiments of the present invention thereto.

It needs to be noted that a thickness direction of the light guide plate 1 refers to a direction from the light emitting surface of the light guide plate 1 pointing to a bottom surface opposite to the light emitting surface of the light guide plate 1.

In an embodiment of the present disclosure, the connector 4 can be integrally formed with the light guide plate 1, or the connector 4 can be formed as an independent structure connected to the light guide plate 1. In case that the connector 4 is integrally formed with the light guide plate 1, it's possible to adopt an injection molding to form the connector 4 along with the light source mounting hole 5, which allows to prepare the connector 4 and the light source mounting hole 5 in a single process, and also is simple and convenient to operate. In case that the connector 4 is formed as an independent structure connected to the light guide plate 1, it's possible to form the connector 4 into a flexible supporting part to realize the connection between the light source 3 and the light source mounting hole 5. Since a shape of the flexible supporting part can be freely changed as required, when the flexible supporting part is connected to the light source 3, the flexible supporting part and the light source 3 can be in full contact with each other according to a flatness of a surface of the light source 3 which contacts with the flexible supporting part, without damaging the surface of the light source 3. Moreover, the flexible supporting part can have various structures, most of which are made of epoxy resin adhesive. The epoxy resin adhesive can be made into any structure as required under a normal state, and can be cured under certain temperature. By utilizing such property, in an embodiment of the present disclosure, the connection between the light source 3 and the light source mounting hole 5 is realized through the connector 4 made of epoxy resin adhesive.

Referring to FIG. 4, in an embodiment of the present disclosure, the flexible circuit board 2 is provided with plural groups of anode-cathode conductive parts 8 in one-to-one correspondence with the light source mounting holes 5, and power is supplied to the light source 3 through a contact between the anode-cathode conductive part 8 and the anode and cathode of the light source 3 to enable the light source 3 to emit light; and in a contacting process, since the connection between the light source 3 and the light source mounting hole 5 is week, the anode and the cathode of the light source 3 and the anode-cathode conductive part 8 may not be in well contact with precise alignment. Thus, an area of every group of anode-cathode conductive parts 8 is made larger than that of the anode and the cathode of the light source 3 in the corresponding light source mounting hole, so as to ensure that the anode and the cathode of the light source 3 can be in well contact with the anode-cathode conductive part 8, and hence to realize the power supply to the light source 3 from the flexible circuit board 2. The anode-cathode conductive part 8 has various types, for example, it's possible to use a bonding pad or a conductive film, which however is not intended to limit the embodiments of the present invention thereto.

Figure 5:
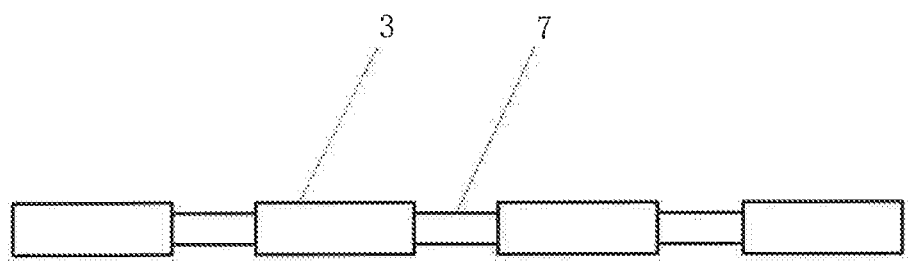
FIG. 5 is a schematic diagram of a chainlike structure formed by a light source and a flexible connecting plate in a backlight module according to an embodiment of the present disclosure.

Referring to FIGS. 3 and 5, in the backlight module according to an embodiment of the present disclosure, on the light emitting surface of the light guide plate 1 or the bottom surface opposite to the light emitting surface, a groove 6 is disposed between adjacent light source mounting holes 5, and the adjacent light source mounting holes 5 are communicated through the groove 6; furthermore, the adjacent light sources 3 are connected by a flexible connecting plate 7, and the flexible connecting plate 7 is located in the groove 6.

In a process of mounting the light source 3 in the light source mounting hole 5, it's possible to firstly connect the light sources 3 together to form a chainlike structure through the flexible connecting plates 7, then mount the light sources 3 of the chainlike structure in the corresponding light source mounting holes 5 respectively, and then disposing the flexible connecting plates 7 on the chainlike structure in the corresponding grooves 6, so as to connect the chainlike structure and the light guide plate 1 together. As compared with the manner of placing the light sources 3 in the light source mounting holes 5 one by one, the above-mentioned manner of assembling the chainlike structure with the light guide plate 1 facilitates the assembling between the light source 3 and the light guide plate 1. In addition, since the flexible connecting plate 7 can be freely bent, it ensures every light source 3 being disposed in its corresponding light source mounting hole 5 by connecting the light sources 3 together through the flexible connecting plates 7.

Moreover, since the groove 6 disposed between the adjacent light source mounting holes 5 can receive the flexible connecting plate 7, the flexible connecting plate 7 between the adjacent light sources 3 can be mounted in the corresponding groove 6; as a result, the grooves 6 disposed between adjacent light source mounting holes 5 avoid a problem that excessive space is occupied when the flexible connecting plate 7 is disposed on the surface of the light guide plate 1. In addition, the flexible connecting plate 7 itself has a certain strength and can be fixedly connected to the groove 6, thus the assembling between the light source 3 and the light guide plate 1 is facilitated by using the flexible connecting plate 7; furthermore, the flexible connecting plate 7 and the groove 6 are fixedly connected such that the light source 3 can be fixed in the light source mounting hole 5 more firmly, which ensures that the light emitting surface of the light source 3 and the light incident surface of the light guide plate 1 are attached with each other.

It needs to be noted that the flexible connecting plate 7 can be of various types, such as an adhesive tape. In case that the adhesive tape serves as the flexible connecting plate 7, the light source 3 can be well fixed in the light source mounting hole 5 for the satisfying viscosity and strength of the adhesive tape.

In addition, for the above-mentioned embodiment, in the case where the light source mounting hole 5 penetrates through the light guide plate 1 along a direction perpendicular to the light emitting surface of the light guide plate 1, the groove 6 and the flexible circuit board 2 are respectively disposed on different surfaces of the light guide plate 1 along a thickness direction; for example, when the groove 6 is disposed on the light emitting surface of the light guide plate 1, the flexible circuit board 2 is disposed on the bottom surface opposite to the light emitting surface of the light guide plate 1; or, when the groove 6 is disposed on the bottom surface opposite to the light emitting surface of the light guide plate 1, the flexible circuit board 2 is disposed on the light emitting surface of the light guide plate 1.

Besides, in the case where the light source mounting hole 5 penetrates through the light guide plate 1 along a direction perpendicular to the light emitting surface of the light guide plate 1, an end face of the light source 3 at the light emitting surface of the light guide plate 1 is flush with the light emitting surface, and an end face of the light source 3 at the bottom surface opposite to the light emitting surface is flush with the bottom surface.

In the above embodiments, the groove 6 and the flexible circuit board 2 are disposed on different surfaces of the light guide plate 1 respectively along the thickness direction of the light guide plate 1, while the anode-cathode conductive part 8 on the flexible circuit board 2 is contacted with the anode and the cathode of the corresponding light source 3; as a result, the anode and the cathode of the light source 3, and the groove 6, are not located on the same side of the light guide plate 1; thus during connecting the light source 3 with the flexible connecting plate 7, it can prevent the flexible connecting plate 7 from covering the anode and the cathode of the light source 3, and ensure the anode and cathode of the light source 3 being contacted with the anode-cathode conductive part 8 on the flexible circuit board 2 in a better way. In addition, after the light source 3 is placed in the light source mounting hole 5, the light source 3 can cover the light incident surface of the light guide plate 1 so that the light emitted by the light source 3 completely enters the light guide plate 1, which effectively prevents the light emitted by the light source 3 from being partly reflected by the incident surface of the light guide plate 1 to result in leakage of the incident light.

The light source 3 mentioned in the preceding embodiments can be a light-emitting diode. The light emitted by the light-emitting diode is wider in color gamut and better in color expression capacity, thus the backlight module using the light-emitting diode as the light source 3 can realize better light-emitting effect.

At least one embodiment of the present disclosure further provides a liquid crystal display device including the above-mentioned backlight module. With the backlight module, both the backlight brightness and the uniformity of the light entering the light guide plate 1 are improved, therefore the liquid crystal display device adopting such backlight module can realize a better display effect.

The liquid crystal display device provided by the embodiments above can be any product or component having a display function, such as a mobile phone, a tablet computer, a television, a displayer, a laptop, a digital photo frame or a navigator.

The foregoing embodiments merely are exemplary embodiments of the disclosure, and not intended to define the scope of the disclosure, and the scope of the disclosure is determined by the appended claims.

The application claims priority of Chinese Patent Application No. 201510555700.1 filed on Sep. 1, 2015, the disclosure of which is incorporated herein by reference in its entirety as part of the present application.

The invention claimed is:

1. A backlight module, comprising a light guide plate and a flexible circuit board, wherein an edge of the light guide plate is provided with plural light source mounting holes disposed along a thickness direction of the light guide plate; a light source is mounted in every light source mounting hole in such a manner that a light emitting surface of the light source is attached onto a hole wall of the light source mounting hole; plural groups of anode-cathode conductive parts are disposed on the flexible circuit board in one-to-one correspondence with the plural light source mounting holes, every group of anode-cathode conductive part is connected to an anode and a cathode of the light source respectively in a corresponding light source mounting hole, and an area of every group of anode-cathode conductive part of the plural groups of anode-cathode conductive parts is larger than that of the anode and the cathode of the light source in the corresponding light source mounting hole, wherein in a light emitting surface of the light guide plate or a bottom surface opposite to the light emitting surface, a groove is disposed between adjacent light source mounting holes, and the adjacent light source mounting holes are communicated through the groove; adjacent light sources are connected by a flexible connecting plate in such a manner that the flexible connecting plate is provided only between the adjacent light sources, and the flexible connecting plate is only located in and fixedly connected to the groove; and the flexible connecting plate is an adhesive tape; wherein the light source mounting hole penetrates through the light guide plate along a direction perpendicular to the light emitting surface of the light guide plate; and wherein the flexible circuit board and the groove are on opposite sides of the light guide plate relative to one another.

2. A liquid crystal display device, comprising the backlight module according to claim 1.

3. The liquid crystal display device according to claim 2, wherein
an end face of the light source located at the light emitting surface of the light guide plate is flush with the light emitting surface of the light guide plate; or
an end face of the light source located at a bottom surface opposite to the light emitting surface is flush with the bottom surface opposite to the light emitting surface.

4. The liquid crystal display device according to claim 2, wherein the light source is mounted in the light source mounting hole through a connector, and the connector is epoxy resin adhesive connected to the hole wall of the light source mounting hole.

5. The liquid crystal display device according to claim 2, wherein the anode-cathode conductive part is a bonding pad or a conductive film.

6. The backlight module according to claim 1, and upon the groove being disposed in the light emitting surface of the light guide plate, the flexible circuit board is disposed on the bottom surface opposite to the light emitting surface; or upon the groove being disposed in the bottom surface opposite to the light emitting surface, the flexible circuit board is disposed on the light emitting surface of the light guide plate.

7. The backlight module according to claim 5, wherein
an end face of the fight source located at the light emitting surface of the light guide plate is flush with the light emitting surface of the light guide plate; or
an end face of the light source located at a bottom surface opposite to the light emitting surface is flush with the bottom surface opposite to the light emitting surface.

8. The backlight module according to claim 1, wherein
an end face of the light source located at the light emitting surface of the light guide plate is flush with the light emitting surface of the light guide plate; or an end face of the light source located at a bottom surface opposite to the light emitting surface is flush with the bottom surface opposite to the light emitting surface.

9. The backlight source according to claim 1, wherein the light source is mounted in the light source mounting hole through a connector, and the connector is epoxy resin adhesive connected to the hole wall of the light source mounting hole.

10. The backlight source according to claim 1, wherein the anode-cathode conductive part is a bonding pad or a conductive film.

\* \* \* \* \*